Aug. 16, 1966  J. SCHICK  3,267,012
METHOD OF RECOVERING CHLORINE AND HYDROGEN
Filed Oct. 5, 1962  4 Sheets-Sheet 1

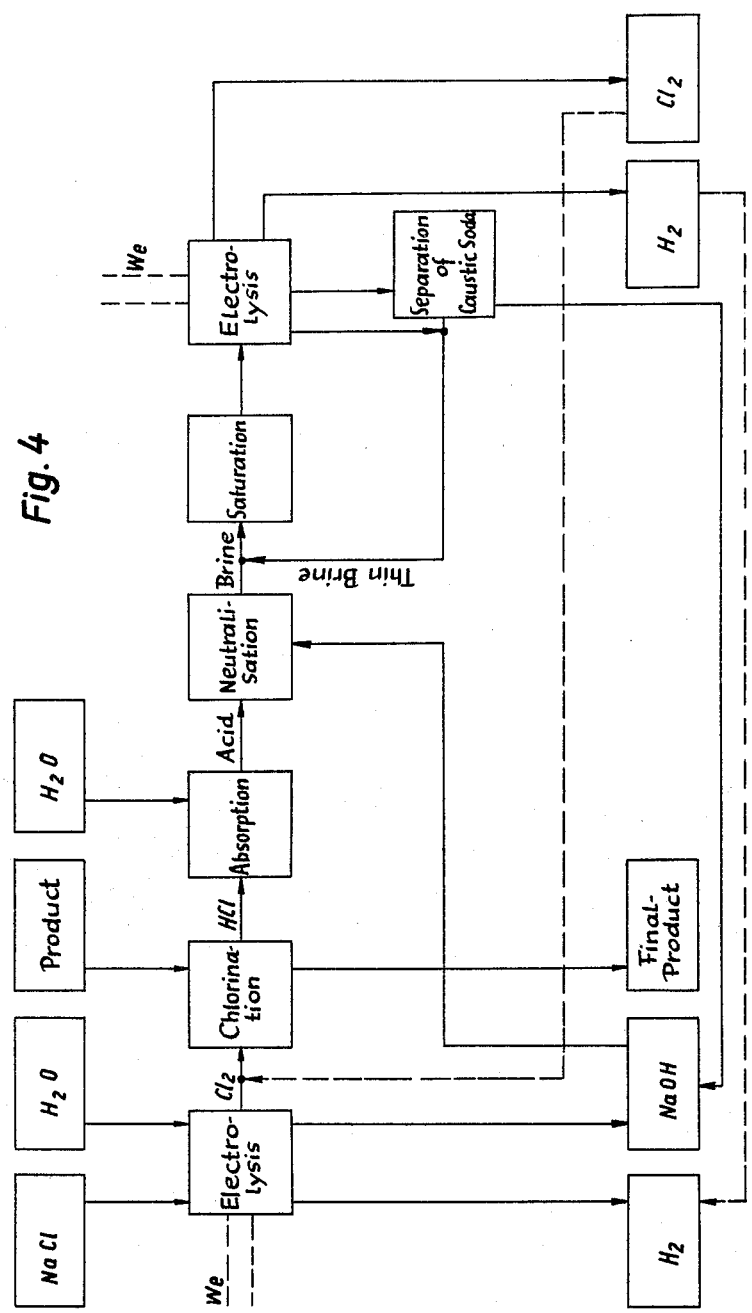

United States Patent Office 3,267,012
Patented August 16, 1966

3,267,012
METHOD OF RECOVERING CHLORINE AND HYDROGEN
Josef Schick, Siegen, Germany, assignor, by mesne assignments, to Metachem A.G., Zug, Switzerland, a Swiss corporation
Filed Oct. 5, 1962, Ser. No. 228,590
Claims priority, application Germany, Oct. 14, 1961, S 76,274
6 Claims. (Cl. 204—128)

This invention relates to a method of recovering gaseous chlorine and gaseous hydrogen from hydrochloric acid.

In recent years there has been a considerable increase in chlorine requirements owing to the rapid development and expansion in the plastics industry. This development is still continuing, since chlorination is widely used in the manufacture of synthetic plastics and entails an ever increasing demand for chlorine.

When chlorination is carried out in a large-scale process, hydrogen chloride is formed in considerable quantities as a by-product, being formed from molecular chlorine and the molecular hydrogen which always occurs in chlorination processes.

The chlorine which reacts in this way is not available for the chlorination process and the hydrochloric acid formed cannot be wholly utilized in other processes since the quantities formed are far in excess of the demand.

In order to utilize the excess hydrochloric acid economically and to enable the chlorine combined therein to be recovered for chlorination processes, the hydrochloric acid has hitherto been decomposed by known hydrogen chloride eelctrolysis processes. The grave disadvantage of hydrogen chloride electrolysis, however, is that both the gaseous decomposition products (which primarily consist of hydrogen and chlorine) and the electrolyte, the anolyte and the catholyte are highly corrosive. As a result, electrolysis cells and all the gas and liquid-carrying pipes in hydrogen chloride electrolysis plants must be made from a material resistant to corrosive compounds. In addition, the seals required in all such plants are also exposed to the corrosive liquids and, since they are generally resistant only to a limited degree, form a permanent source of trouble.

In the process according to the present invention, on the other hand, the hydrochloric acid to be decomposed into gaseous chlorine and gaseous hydrogen is absorbed and neutralized by caustic alkali and the resultant alkali metal chloride brine is subjected to alkali metal chloride electrolysis for the electrolytic separation of chloride and hydrogen, the caustic alkali accumulating in the catholyte during electrolysis being used to neutralize further hydrochloric acid. By this process the corrosive hydrochloric acid is chemically converted into an alkali metal chloride brine which has a neutral reaction and which is substantially less harmful to the electrolysis operation and the apparatus used for the same. The brine may be decomposed in less complicated and less expensive electrolysis cells. In these conditions caustic alkali is liberated in a quantity chemically equivalent to the separated chlorine and the separated hydrogen. The fresh brine obtained on neutralization of the absorbed hydrochloric acid is chemically of high purity, being the product of a chemical reaction.

The anolyte of the alkali metal chloride electrolysis may be used to absorb the hydrochloric acid. According to a particularly preferred embodiment of the invention, the hydrochloric acid is supplied to a closed alkali metal chloride electrolysis cycle in such a manner that it is absorbed by the anolyte and neutralized by the catholyte containing the caustic alkali, and the fresh brine obtained is subjected to electrolysis, during which chlorine and hydrogen are formed in quantities corresponding to the absorbed hydrochloric acid, while after the separation of the gaseous electrolysis products therefrom, the anolyte and catholyte are returned to the cycle. This method permits a very economic recovery of molecular chlorine from hydrochloric acid. Except for the supply of hydrochloric acid and the outlets for the chlorine and hydrogen, the cycle may be completely closed, and this results in an advantageous construction and arrangement of the apparatus required for carrying out the method. In such a closed cycle, it is advantageous to circulate the brine, anolyte and catholyte, and the acid absorbed by the anolyte, at high speed. The alkali metal chloride concentration in the eelctrolysis cell drops only slightly as a result, so that the conductivity of the electrolyte remains high and substantially constant. On the other hand, the caustic alkali concentration in the catholyte remains so low, i.e. below 6% by weight, that no special protective devices are required for the pipe connections and the like subjected to the action of the catholyte. Furthermore, any migration of hydroxyl ions to the anode is effectively counteracted by the high speed of flow of the electrolyte. The electrolysis cells can thus be operated at high current density, for example up to 20,000 a. per sq. metre and hence more economically.

When hydrochloric acid formed as a by-product from a chlorination process has to be decomposed in industrial practice, the arrangement is preferably such that the method according to the invention is applied in conjunction with a principal chlorine-yielding alkali metal chloride electrolysis process associated with the chlorination process. In order to start the above-described circulation or cyclic processes, brine from an external source must be supplied to the electrolysis until the cycle is closed and there is sufficient caustic alkali-containing catholyte for the neutralization.

The neutralization of the absorbed hydrochloric acid is an exothermic process. The resultant heating of the fresh brine is of great advantage since the brine need not be additionally heated and a higher brine temperature gives both better conductivity and reduced dissolution of the anodically discharged chlorine in the electrolyte.

It may be necessary or advantageous for the fresh brine formed by neutralization to be subsequently saturated to a higher concentration before it is electrolysed. This will be the case particularly if the gaseous hydrochloric acid is not absorbed by the anolyte, but for example by water, or is present in aqueous form. In the latter case the volume of the fresh brine must be reduced by an amount corresponding to the proportion of water in the aqueous hydrochloric acid solution and the water separated from the brine may be used to absorb the hydrochloric acid. In the case of gaseous hydrochloric acid, the absorption may be effected, not by the anolyte, but by a brine circulation in an auxiliary cycle.

In any alkali metal chloride electrolysis process, separated gaseous chlorine is dissolved in the anolyte and hypochlorous acid may form. To avoid any over-concentration of such by-products, dechlorination, for example, of the anolyte, may be required and provided. An advantage of the preferred embodiment of the invention, however, is that owing to the rapid circulation of the electrolyte, the brine concentration remains relatively high and hence—and also as a result of the elevated temperature—the proportion of separated chlorine which dissolves is kept low.

Preferred forms of the method according to the invention will now be described, by way of example only, with reference to the flow diagrams forming FIGURES 1 to 4 of the accompanying drawings.

Figure 1:
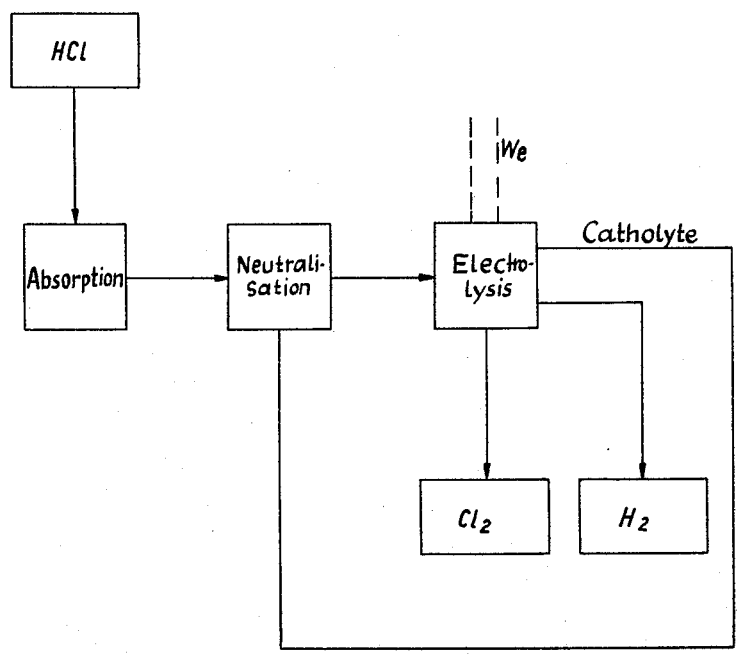
FIGURE 1 is a flow diagram of a method wherein the catholyte is returned for neutralization of the absorbed hydrochloric acid, the hydrochloric acid absorption being effected in various ways, for example by water, brine or by the electrolysis anolyte. The symbol $W_e$ in all the figures denotes the supply of electrical power.
Figure 2:
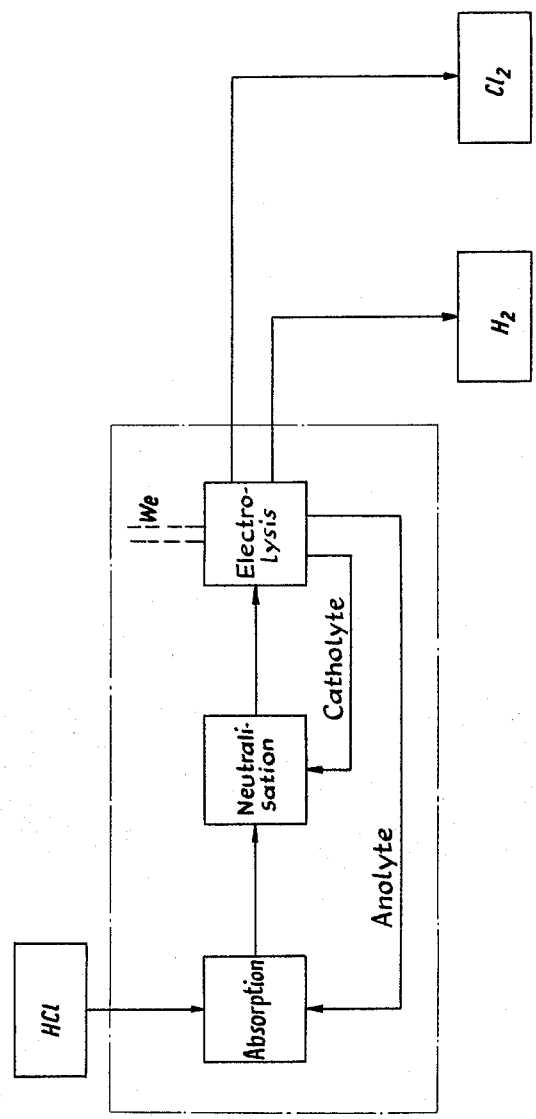
FIGURE 2 shows a preferred form of the cyclic process according to the invention, wherein gaseous hydrochloric acid is absorbed by the anolyte, the resultant acid is neutralized by the caustic alkali content of the catholyte, and the resultant fresh brine is then electrolysed. The actual cycle is framed in dot-dash lines for the sake of clarity.
Figure 3:
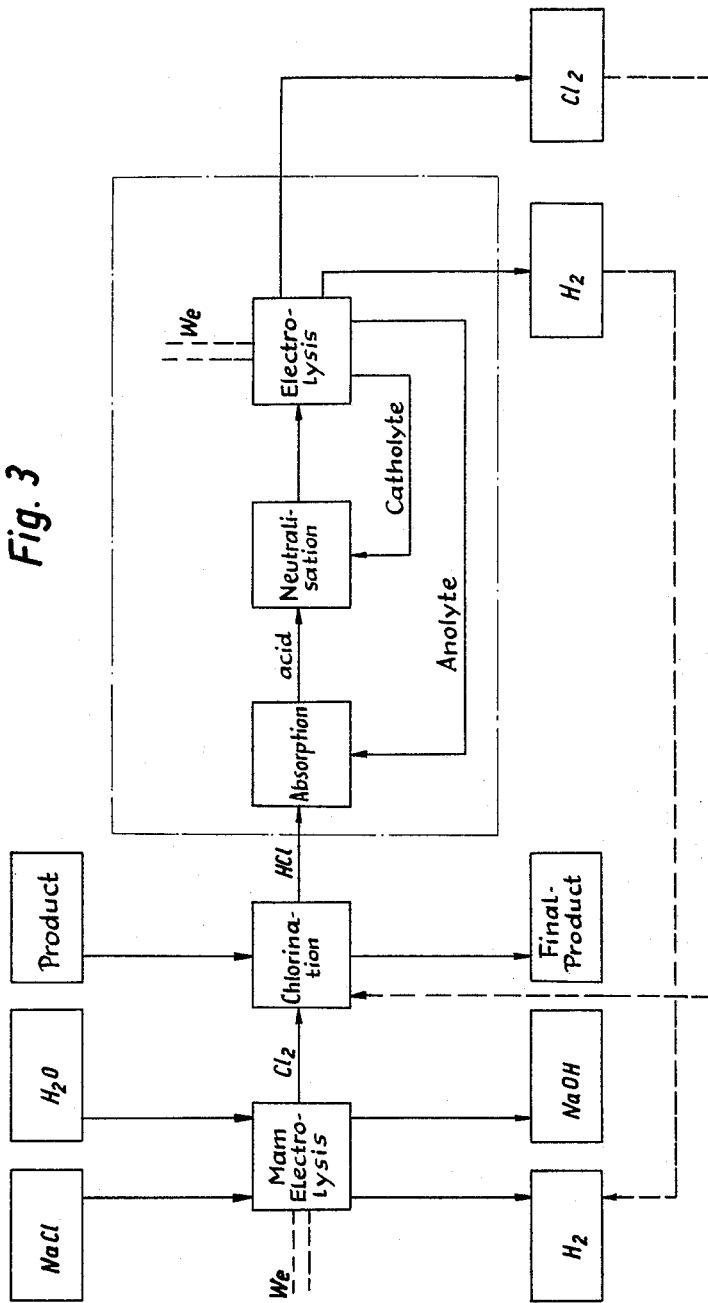

In the flow diagram of FIGURE 3 the method according to the invention is illustrated in conjunction with a chlorination process. The end product is obtained from a preliminary product by chlorination, for example in the manufacture of synthetic plastics. The chlorine required for this purpose is furnished principally by a main alkali metal chloride electrolysis operating in known manner. The by-product of the chlorination is gaseous hydrochloric acid which is supplied to a cyclic process according to the invention. The chlorine liberated by the cyclic process can be directly returned to chlorination, while the molecular hydrogen is added to the hydrogen produced in the main electrolysis.

Where appropriate, the association between the main electrolysis and the method according to the invention may be carried to a point such, as shown in FIGURE 4, that the two processes feed a common caustic alkali supply and only the dilute brine of the catholyte is returned to the process according to the invention. Neutralization of the hydrochloric acid absorbed by fresh water in the embodiment shown in FIGURE 4 is then effected by caustic alkali supplied from the common reservoir. It may then be advantageous to include a saturation station between the neutralization and electrolysis of the method according to the invention.

In all the examples illustrated in the accompanying drawings, caustic soda is used as the caustic alkali since the method according to the invention conventionally operates with sodium chloride electrolysis.

To give an idea of the extent to which the individual elements and compounds participate in the method according to the invention, details are given below, with reference to the proportion of caustic soda, of the proportions of the other elements and compounds (rounded off), in grams according to their atomic or molecular weights. This will show the relative weight of the separated gaseous electrolysis products in relation to the total quantities by weight participating in the process.

This is shown even more clearly by the following chemical equations for a neutralization and electrolysis in conjunction with the corresponding proportion equations given with reference to the caustic soda ($=1$).

*Proportions by weight (caustic soda=1)*

Sodium _____ 0.575
Chlorine _____ 0.886
Oxygen _____ 0.400
Hydrogen _____ 0.025
Sodium chloride _____ 1.461
Water _____ 0.450
Hydrochloric acid _____ 0.911

*Neutralization*

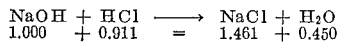

*Electrolysis*

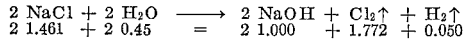

A direct indication of the electrolysis products (in grams per kg. of brine) decomposed per kg. of circulating brine is given by multiplying the proportional quantities by the percentage by weight of the quantities separated on passage through electrolysis, and multiplying the result by ten. Since the content of caustic soda in the catholyte should not exceed 6% by weight for the reasons described in detail above, this value corresponds to the liberation of 53.16 grams of chlorine per kg. of circulating brine by the method according to the invention. For this purpose 87.66 grams of sodium chloride and 27.00 g. of water must be decomposed.

An electrolysis cell similar to the one shown in United States Patent 2,978,401 issued April 4, 1961, to P. E. Hoch et al. can be used in the present invention to separate the anolyte and catholyte into separate streams.

In the description of the present invention it has been assumed that the economic importance of the method according to the invention is due to the existence of an excess of hydrochloric acid; it should be understood, however, that the invention is also valuable if the primary object is to produce chlorine without an accumulation of caustic soda.

What I claim is:

1. A method of recovering gaseous chlorine and gaseous hydrogen from hydrochloric acid, which comprises the steps of absorbing the hydrochloric acid in an aqueous medium, neutralizing the hydrochloric acid-containing solution formed with caustic alkali, electrolysing the resulting alkali metal chloride brine in an electrolysis cell having anode and cathode compartments separated by a diaphragm to effect electrolytic separation of chlorine and hydrogen, all of the caustic alkali formed in the catholyte in said cathode compartment during electrolysis being returned to the neutralizing step to neutralize the hydrochloric acid.

2. A method according to claim 1, wherein the hydrochloric acid is absorbed in the anolyte of the alkali metal chloride electrolysis cell.

3. A method of recovering gaseous chlorine and gaseous hydrogen from hydrochloric acid, which comprises the steps of introducing hydrochloric acid into a cyclic alkali metal chloride electrolysis circuit including an electrolysis cell having anode and cathode chambers separated by a diaphragm wherein said hydrochloric acid is absorbed by the anolyte of said electrolytic cell and is neutralized by the caustic alkali-containing catholyte of said cathode chamber, electrolysing the brine formed by said neutralization to form chlorine and hydrogen in quantities corresponding to the absorbed hydrochloric acid, and re-cycling the anolyte and catholyte from the electrolysis, after separation of the gaseous electrolysis products therefrom.

4. A method according to claim 3, wherein the brine is passed through the electrolysis cell sufficiently fast to maintain the caustic alkali content of the catholyte below 6% by weight.

5. A method of recovering chlorine and hydrogen from hydrochloric acid produced as a by-product in a chlorination process, which comprises the steps of effecting a main alkali metal chloride electrolysis to produce chlorine for a chlorination process, effecting said chlorination process which produces hydrochloric acid as a by-product, absorbing said by-product hydrochloric acid in water, neutralizing the resulting solution with caustic alkali, saturating the alkaline metal chloride brine obtained from the neutralization of said resulting solution, effecting a second alkali metal chloride electrolysis on said saturated brine in an electrolysis cell having anode and cathode compartments divided by a diaphragm to form chlorine and hydrogen in quantities proportionate to the absorbed hydrochloric acid, passing the catholyte from said cathode compartment of said second electrolysis to a separator wherein caustic alkali is separated therefrom, the anolyte from the anode compartment of said second electrolysis and the caustic alkali-free product of said separator being mixed with said brine prior to said saturation step, the caustic alkali formed by said main and said second electrolysis being used in said neutralization step, and the chlorine formed by said second electrolysis being added to the chlorine produced by said main electrolysis for use in said chlorination step.

6. A method according to claim 5, wherein said caustic alkali is caustic soda and said alkali metal chloride is sodium chloride.

References Cited by the Examiner
UNITED STATES PATENTS

| | | | |
|---|---|---|---|
| 583,330 | 4/1892 | Le Sueur | 204—98 |
| 2,468,766 | 5/1949 | Low | 204—128 |
| 2,719,822 | 10/1955 | Kassel | 204—128 |
| 2,978,401 | 4/1961 | Hoch et al. | 204—98 |

OTHER REFERENCES

Chem. Eng. Progress, volume 46, No. 9, pages 456–63, September 1950.

JOHN H. MACK, *Primary Examiner.*

MURRAY TILLMAN, *Examiner.*

L. G. WISE, *Assistant Examiner.*